(12) United States Patent
Ebert et al.

(10) Patent No.: US 9,377,059 B2
(45) Date of Patent: Jun. 28, 2016

(54) VIBRATION DAMPER FOR A DRIVETRAIN

(75) Inventors: Alexander Ebert, Oberkirch (DE); Martin Lehmann, Hornberg (DE)

(73) Assignee: Amtek Tekfor Holding GmbH, Hausach (DE)

( * ) Notice: Subject to any disclaimer, the term of this patent is extended or adjusted under 35 U.S.C. 154(b) by 158 days.

(21) Appl. No.: 14/238,140

(22) PCT Filed: Aug. 4, 2012

(86) PCT No.: PCT/DE2012/000797
§ 371 (c)(1),
(2), (4) Date: Sep. 22, 2014

(87) PCT Pub. No.: WO2013/020546
PCT Pub. Date: Feb. 14, 2013

(65) Prior Publication Data
US 2015/0045125 A1 Feb. 12, 2015

(30) Foreign Application Priority Data
Aug. 11, 2011 (DE) .................. 10 2011 110 021

(51) Int. Cl.
*F16D 3/76* (2006.01)
*F16D 3/68* (2006.01)
*F16F 15/124* (2006.01)

(52) U.S. Cl.
CPC ............ *F16D 3/68* (2013.01); *F16F 15/1245* (2013.01)

(58) Field of Classification Search
CPC .................. F16D 3/68; F16F 15/1245
USPC .......................... 464/74, 75, 90, 91
See application file for complete search history.

(56) References Cited

U.S. PATENT DOCUMENTS

| 3,345,831 A | 10/1967 | Boole |
| 2012/0004043 A1 | 1/2012 | Lehmann |

FOREIGN PATENT DOCUMENTS

| CH | 270325 | * 12/1950 |
| DE | 1 475 519 A1 | 5/1969 |
| DE | 10 2009 057 914 A1 | 6/2011 |
| FR | 1 128 208 A | 1/1957 |
| WO | WO 2010/102611 A1 | 9/2010 |

OTHER PUBLICATIONS

International Search Report dated Dec. 13, 2012 with English translation (six (6) pages).

* cited by examiner

*Primary Examiner* — Gregory Binda
(74) *Attorney, Agent, or Firm* — Crowell & Moring LLP

(57) ABSTRACT

A vibration damper and a drive shaft comprising a vibration damper having a small radial extent is provided. A first shaft part is provided with a sleeve and a second shaft part is provided with an inner part which extends axially into the sleeve. The sleeve and the inner part include longitudinal rotary drivers that engage negative profiles of an damping part which is elastically deformable in the direction of shaft rotation and includes at least one decoupling ring and at least one pair of rotation limiting rings.

8 Claims, 4 Drawing Sheets

VIBRATION DAMPER FOR A DRIVETRAIN

This application is a National Phase of PCT International Application No. PCT/DE2012/000797, filed Aug. 4, 2012, which claims priority under 35 U.S.C. §119 from German Patent Application No. 10 2011 110 021.4, filed Aug. 11, 2011, the entire disclosures of which are expressly incorporated by reference herein.

BACKGROUND AND SUMMARY OF THE INVENTION

The invention relates to a drive shaft comprising connecting parts which are arranged on each end of said drive shaft and which are designed for a rotationally locked connection with connecting components, and comprising a vibration absorber, which is arranged between said connecting components.

A vibration damper conforming to its genre is described in International patent publication no. WO 2010/102611 A1.

The object of the present invention is to improve the aforementioned vibration damper of the prior art.

This engineering object is achieved in that there is a decoupling ring, which comprises recesses, in addition to the negative profiles; and in that there is at least one pair of rotation limiting rings, which are free of additional recesses, and in that the decoupling ring is arranged axially along the longitudinal axis between the rotation limiting rings.

One embodiment provides that at least one portion of the rotary drivers and each of the associated negative profiles are constructed and coordinated with each other in such a way that at least one pocket is formed between the rotary drivers and each of the associated negative profiles.

One embodiment includes that at least one portion of the rotary drivers and each of the associated negative profiles are constructed and coordinated with each other in such a way that a pocket is formed between the rotary drivers and each of the associated negative profiles on each of the flanks of the rotary drivers.

One embodiment provides that the rotary drivers of the inner part and each of the associated negative profiles of the rotation limiting rings are constructed and coordinated with each other in such a way that a pocket is formed between the rotary drivers of the inner part and each of the associated negative profiles of the rotation limiting rings on each of the flanks of the rotary drivers.

One embodiment includes that the recesses of the decoupling ring are constructed as longitudinal grooves on the outer face and the inner face of the decoupling ring. In this case the outer face is the region of the damping part that faces the sleeve; and the inner face is the region of the damping part that faces the inner part.

One embodiment provides that the negative profiles and the recesses of the decoupling ring alternate over the periphery of the decoupling ring. At the same time different numbers of negative profiles and recesses alternate. Preferably in this case the negative profiles and the recesses relate to those negative profiles and recesses that are arranged, for example, in the manner of grooves, in the respective outer face or inner face, that is, in the same (inner/outer) face.

One embodiment includes that two recesses, which are formed as grooves of the outer face or the inner face, are arranged over the periphery of the decoupling ring between two negative profiles, which are constructed as grooves of the outer face or the inner face of the decoupling ring. Therefore, in this embodiment two recesses of the outer face may be found between each of the two negative profiles of the outer face. The same applies to the negative profiles or recesses of the inner face.

The invention also relates to a drive shaft with a vibration damper according to one of the above embodiments. This embodiment provides that each end has connecting parts for a rotationally locked connection with connecting components; and that the vibration damper is arranged between said connecting components. As a result, the drive shaft can comprise, for example joints and/or a displacement unit. The drive shaft can be used, for example, in a drive train of a motor vehicle as the longitudinal shaft and/or the side drive shaft. In this case said drive shaft has rotationally locked end regions for a rotationally locked connection with additional connecting components of the drive train, such as the transmission output shafts, differential input shafts or the differential output shafts, wheel hubs and the like, and is disposed between said connecting components of the vibration damper described above.

Other objects, advantages and novel features of the present invention will become apparent from the following detailed description of one or more preferred embodiments when considered in conjunction with the accompanying drawings.

DETAILED DESCRIPTION

Figure 1:
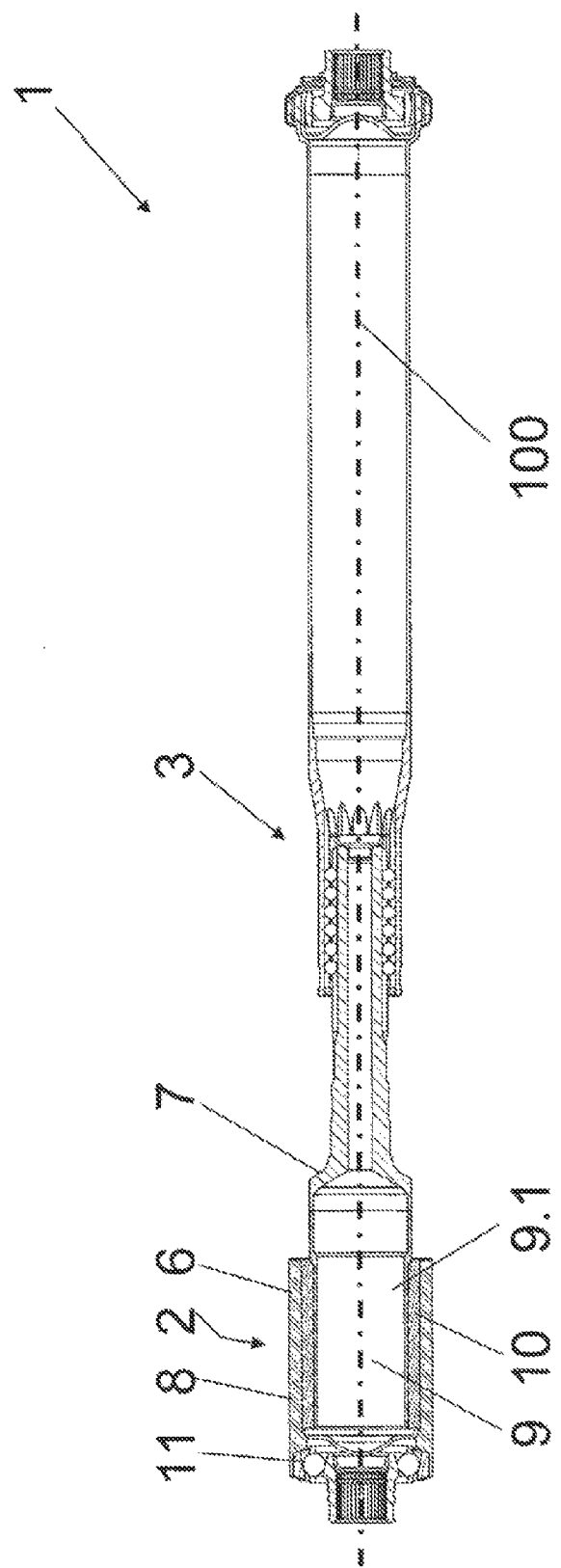
FIG. 1 is a partially cut view of a drive shaft with a vibration damper according to an embodiment of the invention.

FIG. 1 shows the drive shaft 1 comprising a vibration damper 2 and the linear displacement unit 3, and the axis of rotation or the axis of symmetry or the longitudinal axis 100. The vibration damper 2 is integrated into the drive shaft 1 by means of the first and second shaft parts 6, 7. The first shaft part 6 is designed in the form of a sleeve 8, into which the inner part 9 of the second shaft part 7 or more specifically the end region 9.1 of the inner part 9 is inserted axially. The damping part 10 is disposed radially between the sleeve 8 and the inner part 9; and this damping part is configured so as to be elastic; and/or this damping part contains elastic elements. The sleeve 8 and the inner part 9 comprise rotary drivers for the damping part 10 so that the torque, which is to be transmitted by means of the drive shaft 1, is transferred; and peak torques, which occur, for example, in the case of jerks in the drive, torsional vibrations and the like, are filtered, in that the peak torques give rise to a temporary storage buffer and/or an elimination by conversion into heat in the damping part. A constant velocity joint 11 is integrated in the vibration damper 2. For more details of the description of FIG. 1 see WO 2010/102611 A1.

Figure 2:
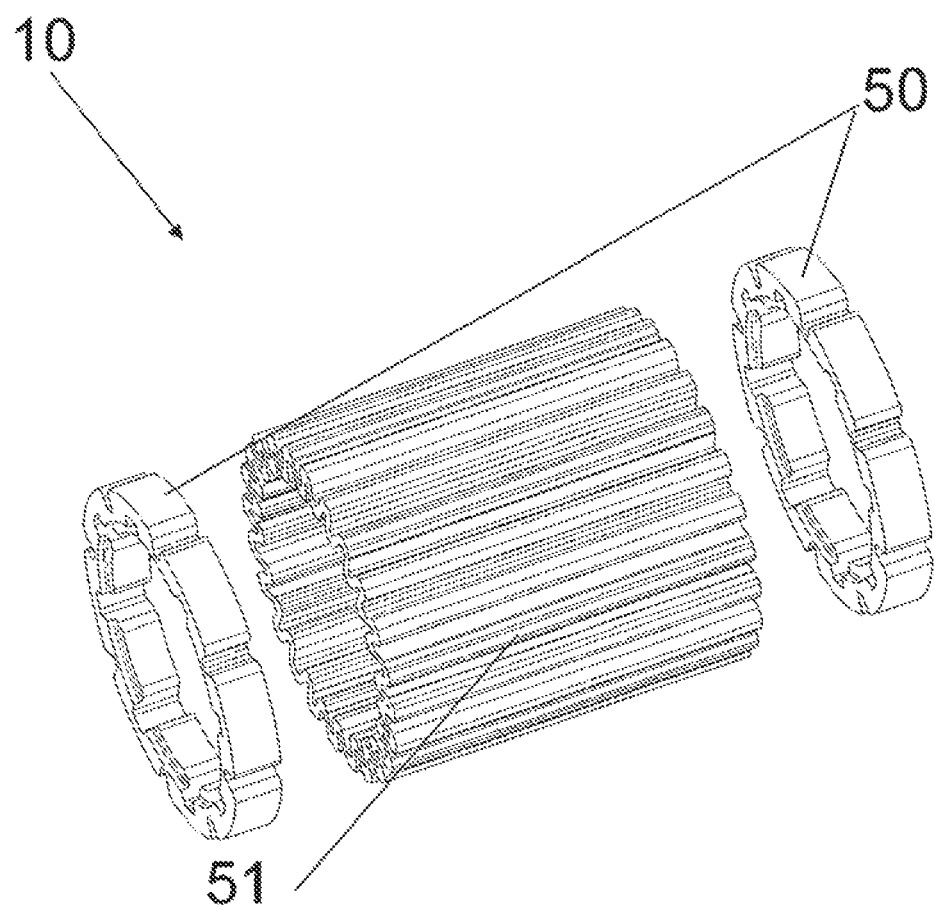
FIG. 2 an exploded view of the damping part of a vibration damper according to the invention.

The vibration damper 10 from FIG. 2 consists of three rings; or, as an alternative said vibration damper may also consist of more than three rings; and these rings are arranged one behind the other along the longitudinal axis. In this case the two outer rings 50 (hereinafter referred to as: rotational angle limiting ring) are identical in their construction in this embodiment, and the center ring 51 (hereinafter referred to as: decoupling ring) has a considerably greater height than the other two rings 50. In one embodiment the rings 50, 51 are made of a synthetic plastic material and, in particular, are not made of a pure elastomer. These rings can have substantially identical or also different material properties. For example, they can exhibit varying rigidity. One advantage of the different designs of the rings 50, 51 is that the requirements for the damping part 10, damping properties and a low rigidity, are fulfilled. The friction between the individual rings 50, 51 makes it possible to achieve an even greater degree of damping. In order to achieve damping, the energy must be extracted from the system in the form of heat, for which purpose the components involved are moved in rotation. The type of movement can be adjusted by the geometry of the negative profiles and/or the recesses.

The damping element 10 has two rotational angle limiting rings 50, which are guided radially between the sleeve and the inner part. Between the rotational angle limiting rings 50 there is a decoupling ring 51 with additional recesses that allow the decoupling ring 51 to rest freely between the sleeve and the inner part in the radial direction. The decoupling ring 51 does not have any radial guidance functions, but rather fulfills in essence only the function of damping.

Figure 3:
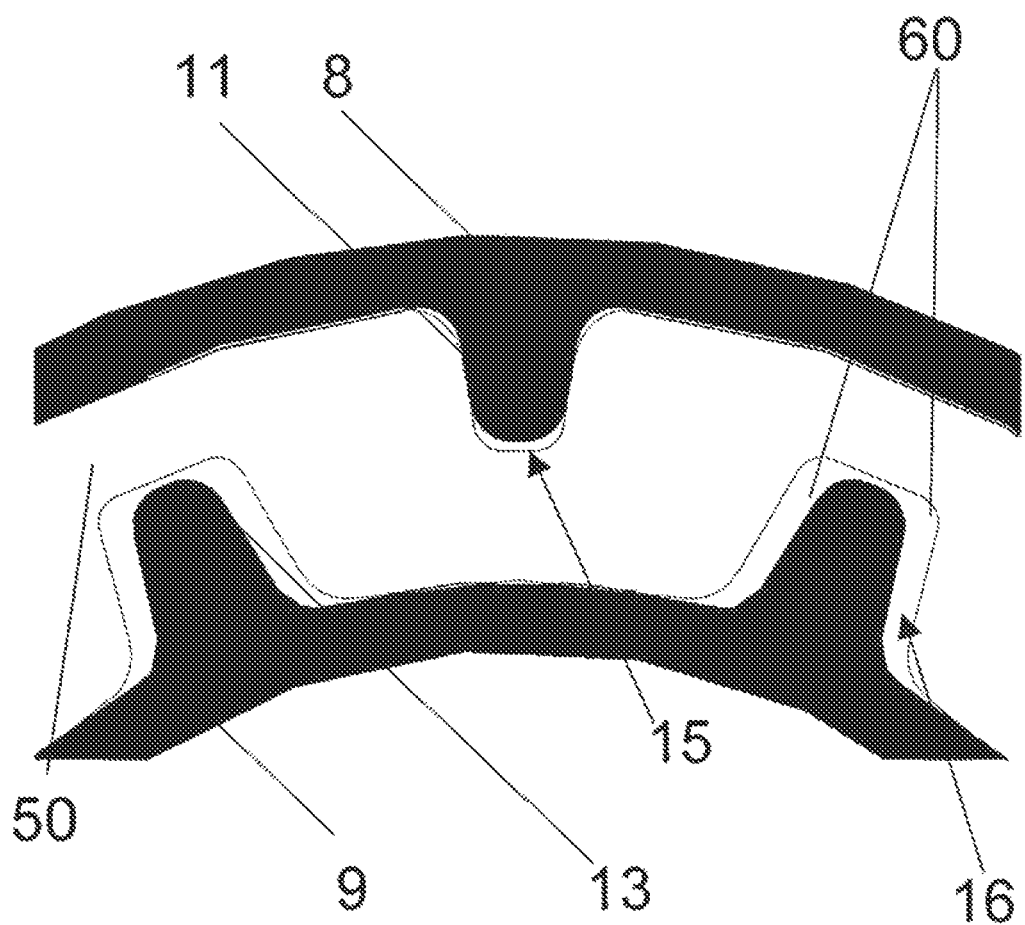
FIG. 3 a portion of a cross section of a ring of the damping part from FIG. 2.

In order to illustrate clearly the construction of the vibration damper, FIG. 3 shows a portion of a cross section of the vibration damper with the sleeve 8 and the inner part 9 and the rotational angle limiting ring 50, which is arranged radially between said sleeve and said inner part. The sleeve 8, which is made, for example, of a metal and is produced, for example, from a suitably formed tubing material, has rotary drivers 11, which are configured in the embodiment shown in the form of longitudinal ribs, which extend radially inwards and axially along the sleeve 8. Distributed over the periphery, rotary drivers 13, which are directed radially outwards, are provided in the form of longitudinal ribs on the inner part 9. The rotational angle limiting ring 50 of the damping part is received in a rotationally locked fashion in the rotary drivers 11, 13.

For this purpose the rotational angle limiting ring 50 has corresponding negative profiles 15, 16, which in this case are formed by longitudinal grooves and which are pushed onto each of the rotary drivers 11, 13. The longitudinal grooves have the advantage that they offer large areas for the transmission of compressive forces. The rotational angle limiting ring 50 makes contact with its outer face or inner face with each of the walls of the sleeve 8 or more specifically the inner part 9 between the rotary drivers 11, 13, as a result of which a radial guide is produced. The negative profiles 13, which are constructed as grooves on the inner face of the rotational angle limiting ring 50 that faces the inner part 9, and the rotary drivers 13 of the inner part 9 are constructed and coordinated with each other in such a way that in each case they produce pockets 60, which are laterally adjacent to the flanks of the rotary drivers 13 of the inner part 9.

Figure 4:
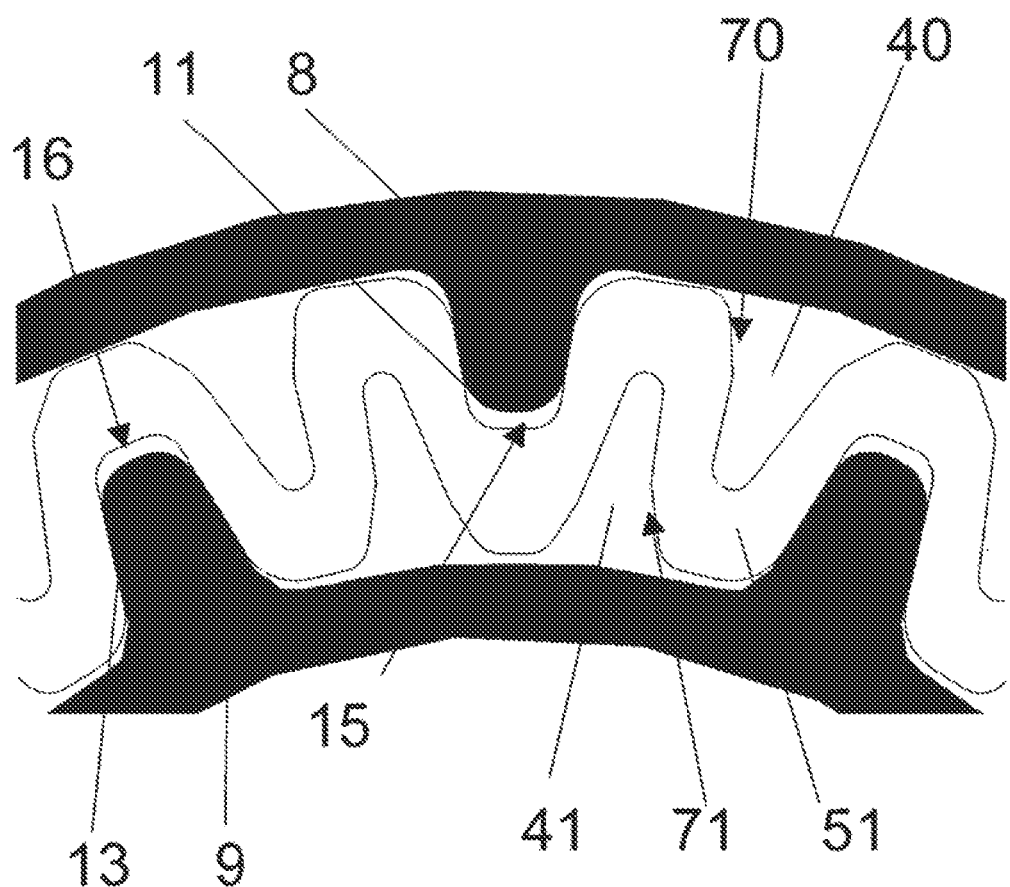
FIG. 4 a portion of a cross section of another ring of the damping part from FIG. 2.

The decoupling ring 51 of the damping part from FIG. 4 has, in addition to the negative profiles 15, 16, two recesses 40, 41 between the sleeve 8 and the inner part 9, where, as an alternative, it is also possible for there to be more than two recesses; and these recesses do not receive the rotary drivers 11, 13. In this case the recesses 40, 41 are constructed as grooves of the outer face 70 and the inner face 71 of the decoupling ring 51, once on the radially outwards oriented outer face 70 in the direction of the sleeve 8 (recesses 40) and once on the radially inwards oriented inner face 71 in the direction of the inner part 9 (recesses 41). In this respect two recesses 40 are provided between each of two negative profiles 15, which are constructed as grooves of the outer face 70 of the decoupling ring 51. These two recesses are also constructed as grooves in the outer face 70 of the decoupling ring 51. The same applies to the inner face 71 and its negative profiles 16 or the recesses 41. In this case there is a groove of a negative profile 15 of the outer face 70 of the decoupling ring 51 between two grooves 41, which are grooves of the inner face 71, in the circumferential direction. Furthermore, the material web between two recesses 40, 41 of the outer face 70 and/or the inner face 71 of the decoupling ring 51 in the direction of each contacting components (that is, the sleeve 8 or the inner part 9) is kept as narrow as possible. As a result, the contact face of the decoupling ring 51 is lowered onto the sleeve 8 or onto the inner part 9. Furthermore, the decoupling ring 51, the sleeve 8 and the inner part 9 are designed in such a way that the decoupling ring 51 is radially free between the sleeve 8 and the inner part 9. The force is applied by way of the lateral contact of the decoupling ring 51 with the flanks of the rotary drivers 11, 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vibration damper for a drive shaft of a drive train, the drive shaft comprising a first shaft part, a second shaft part and an elastically deformable damping part disposed between the shaft parts and acted upon by each of the two shaft parts in a rotationally locked manner, the first shaft part comprising a sleeve with radially inwards directed rotary drivers for the damping part;
the second shaft part comprising an inner part with radially outwards directed rotary drivers for the damping part;
an end region of the inner part being surrounded by the sleeve;
the rotary drivers being longitudinal ribs extending along a longitudinal axis of the vibration damper;
the elastically deformable damping part being arranged radially between the sleeve and the end region of the inner part;
the elastically deformable damping part
comprising two rotation limiting rings and a decoupling ring, each ring comprising negative profiles formed as longitudinal grooves with which the rotary drivers engage;
the decoupling ring being arranged axially along the longitudinal axis between the two rotation limiting rings;
the decoupling ring comprising, in addition to the negative profiles, recesses arranged to not engage the radially outwards and radially inwards directed rotary drivers;
the negative profiles and the recesses of the decoupling ring alternating in a circumferential direction about the decoupling ring; and
each of the two rotation limiting rings comprising, in addition to the negative profiles, regions without recesses corresponding to the decoupling ring recesses.

2. The vibration damper as claimed in claim 1, wherein the rotary drivers are arranged about their respective shaft parts such that at least one decoupling part negative profile is located circumferentially between one of the radially outwards directed rotary drivers and an adjacent one of the radially inwards directed rotary drivers.

3. The vibration damper as claimed in claim 2, wherein
the at least one decoupling part negative profile is located between flanks of the rotary drivers.

4. The vibration damper as claimed in claim 3, wherein
the rotary drivers of the inner part are arranged such that one of the negative profiles of the rotation limiting rings are located between flanks of adjacent inner part rotary drivers.

5. The vibration damper as claimed in claim 1, wherein
the recesses of the decoupling ring are longitudinal grooves on an outer face and an inner face of the decoupling ring.

6. The vibration damper as claimed in claim 1, wherein
two recesses formed as grooves of the outer face or the inner face of the decoupling ring are arranged over the periphery of the decoupling ring between two negative profiles.

7. A drive shaft, comprising:
a first shaft part;
a second shaft part; and
a vibration damper, the vibration damper comprising an elastically deformable damping part disposed between the shaft parts and acted upon by each of the two shaft parts in a rotationally locked manner,
　the first shaft part comprising a sleeve with radially inwards directed rotary drivers for the damping part;
　the second shaft part comprising an inner part with radially outwards directed rotary drivers for the damping part;
　an end region of the inner part being surrounded by the sleeve;
　the rotary drivers being longitudinal ribs extending along a longitudinal axis of the vibration damper;
　the elastically deformable damping part being arranged radially between the sleeve and the end region of the inner part;
　the elastically deformable damping part
　　comprising two rotation limiting rings and a decoupling ring, each ring comprising negative profiles formed as longitudinal grooves with which the rotary drivers engage;
　　the decoupling ring being arranged axially along the longitudinal axis between the rotation limiting rings;
　　　the decoupling ring comprising, in addition to the negative profiles, recesses arranged to not engage the radially outwards and radially inwards directed rotary drivers;
　　　the negative profiles and the recesses of the decoupling ring alternating in a circumferential direction about the decoupling ring; and
　　　each of the two rotation limiting rings comprising, in addition to the negative profiles, regions without recesses corresponding to the decoupling ring recesses.

8. The drive shaft as claimed in claim 7, wherein
each end of the drive shaft has connecting parts with connecting portions configured for a rotationally locked connection with connecting components; and
the vibration damper is arranged between said connecting portions.

* * * * *